(12) United States Patent
Sasaki et al.

(10) Patent No.: US 7,365,914 B2
(45) Date of Patent: Apr. 29, 2008

(54) ACTUATOR

(75) Inventors: Ryota Sasaki, Saitama (JP); Mitsuo Manabe, Saitama (JP); Kiyoto Sato, Saitama (JP)

(73) Assignee: Fujinon Corporation, Saitama-Shi (JP)

( * ) Notice: Subject to any disclaimer, the term of this patent is extended or adjusted under 35 U.S.C. 154(b) by 0 days.

(21) Appl. No.: 11/501,762

(22) Filed: Aug. 10, 2006

(65) Prior Publication Data

US 2007/0036532 A1    Feb. 15, 2007

(30) Foreign Application Priority Data

Aug. 12, 2005   (JP) ............................ P2005-234638

(51) Int. Cl.
*G02B 15/14* (2006.01)

(52) U.S. Cl. ...................... 359/696; 359/694

(58) Field of Classification Search ......... 359/694–704
See application file for complete search history.

(56) References Cited

U.S. PATENT DOCUMENTS 5,155,418 A * 10/1992 Kataoka ..................... 318/116

2002/0084719 A1   7/2002  Okamoto et al.
2004/0007941 A1   1/2004  Yuasa et al.
2007/0075610 A1*  4/2007  Manabe et al. ............. 310/348

FOREIGN PATENT DOCUMENTS

| EP | 0 464 764 A1 | 1/1992 |
| JP | 06-123830    | 5/1994 |
| JP | 2633066 B2   | 4/1997 |

* cited by examiner

*Primary Examiner*—M. Hasan
(74) *Attorney, Agent, or Firm*—Birch, Stewart, Kolasch & Birch, LLP

(57) ABSTRACT

An actuator comprises: an electro-mechanical conversion element; a driving frictional member that is mounted onto one side in an extension/contraction direction of the electro-mechanical conversion element; a driven member that is frictionally engaged with the driving frictional member; a fixed frame; an elastic supporting member that is mounted onto the other side in the extension/contraction direction of the electro-mechanical conversion element and displaceably supports the other side of the electro-mechanical conversion element with respect to the fixed frame; and a pressing member that presses the elastic supporting member in the extension/contraction direction to maintain the elastic supporting member in an elastically deformed state.

10 Claims, 7 Drawing Sheets

ACTUATOR

BACKGROUND OF THE INVENTION

1. Field of the Invention

The present invention relates to an actuator, and particularly relates to an actuator that is installed in a digital camera, mobile phone, or other compact precision apparatus and drives a zoom lens.

2. Description of the Invention

As a driving device for a lens unit of a digital camera, etc., an actuator that employs a piezoelectric element is used. For example, with an actuator of Japanese Patent No. 2633066, a driving shaft is affixed to one side of a piezoelectric element, and the other side of the piezoelectric element is fixed to a main device body. A lens barrel is slidably supported on the driving shaft, and the lens barrel is frictionally engaged with the driving shaft by making use of an urging force of a plate spring. Drive pulses of substantially sawtooth-like waveform are applied to the piezoelectric element, and the piezoelectric element deforms at different speeds in an extension direction and a contraction direction. For example, when the piezoelectric element gradually deforms, the lens barrel moves along with the driving shaft. Oppositely, when the piezoelectric element rapidly deforms, the lens barrel stays at the same position due to its mass inertia. Thus, by repeatedly applying drive pulses of substantially sawtooth-like waveform to the piezoelectric element, the lens barrel can be moved intermittently at a fine pitch.

However, with the actuator of Japanese Patent No. 2633066, the piezoelectric element frequently undergoes resonant vibration, and because, the piezoelectric element or the driving shaft undergoes lateral vibration or torsion in directions that differ from the displacement direction due to this resonant vibration, a driven member does not accurately move in the displacement direction. The actuator of Japanese Patent No. 2633066 is thus unstable in driving amount with respect to driving frequency.

As a method for resolving the above issue, a method for displaceably supporting the other side of the piezoelectric element and attaching a weight member to the other side of the piezoelectric element may be considered.

However, with this method, because when the weight of the weight member is small, the moving distance, moving speed, and thrust of the driven member are inadequate, a weight member of large weight must be used and the device thus becomes large. Especially when a driven member is to be moved across a large moving distance as in the case of zoom lens, a weight member of extremely large weight is necessary and the device becomes large.

SUMMARY OF THE INVENTION

The present invention has been made in view of these circumstances, and an object thereof is to provide an actuator that can perform stable drive control and yet can be made compact.

To achieve the above object, according to a first aspect of the invention, there is provided an actuator comprising: an electro-mechanical conversion element; a driving frictional member that is mounted onto one side in an extension/contraction direction of the electro-mechanical conversion element; a driven member that is frictionally engaged with the driving frictional member; a fixed frame; an elastic supporting member that is mounted onto the other side in the extension/contraction direction of the electro-mechanical conversion element and displaceably supports the other side of the electro-mechanical conversion element with respect to the fixed frame; and a pressing member that presses the elastic supporting member in the extension/contraction direction to maintain the elastic supporting member in an elastically deformed state.

The inventor of the present invention made the finding that by supporting the other side of the electromechanical conversion element via the elastic supporting member and maintaining the elastic supporting member in the elastically deformed state, the same effect as attaching a large weight to the other side of the electro-mechanical conversion element, that is, improvement of the moving distance, moving speed, and thrust of the driven member can be achieved.

Because the first aspect of the invention is made in view of these circumstances and the elastic supporting member is held in the elastically deformed state, the moving distance, moving speed, and thrust of the driven member can be improved. Furthermore, according to the first aspect of the invention, because the elastic supporting member is simply pressed, the device can be made more compact than when a large weight member is used.

A second aspect of the invention provides the actuator according to the first aspect of the invention, wherein the pressing member is integrally formed with the fixed frame. Thus with the second aspect of the invention, the number of parts can be reduced and the device can be made even more compact.

A third aspect of the invention provides the actuator according to the first aspect of the invention, wherein the pressing member is an adjusting screw that is screwed onto the fixed frame, and the elastic supporting member is pressed by a tip of the adjusting screw. With the third aspect of the invention, the pressing force can be adjusted by the degree of tightening of the adjusting screw.

A fourth aspect of the invention provides the actuator according to any of the first to third aspects of the invention, wherein the elastic supporting member is a plate member having a spring property and has both of its ends supported by the fixed frame, and a rear end face of the electromechanical conversion element is affixed to a central portion of the elastic supporting member.

A fifth aspect of the invention provides the actuator according to any of the first to fourth aspects of the invention, wherein a holding frame of a zoom lens is mounted onto the driven member.

DETAILED DESCRIPTION OF THE INVENTION

Preferred embodiments of an actuator according to the present invention shall now be described in detail with reference to the attached drawings.

Figure 1:
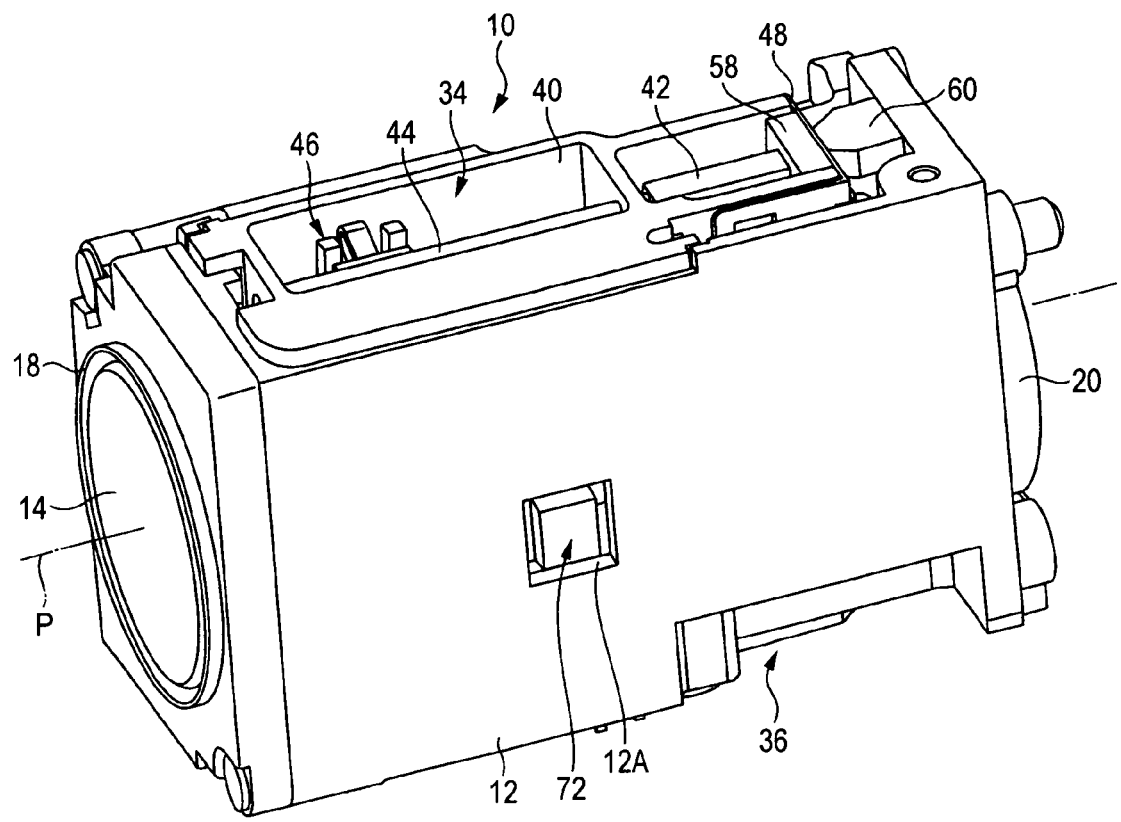
FIG. 1 is a perspective view of a lens device to which an actuator according to the present invention is applied.
Figure 2:
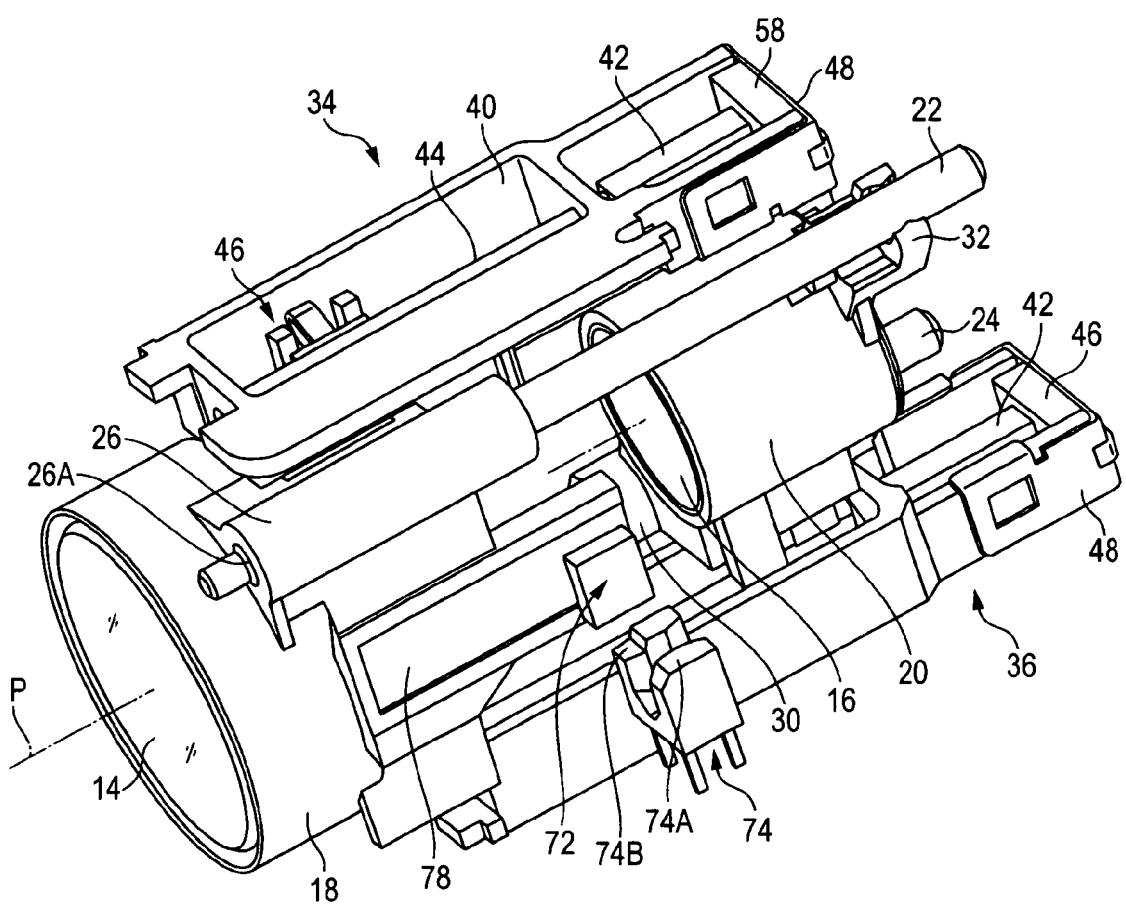
FIG. 2 is a perspective view of an internal arrangement of the lens device of FIG. 1.
Figure 3:
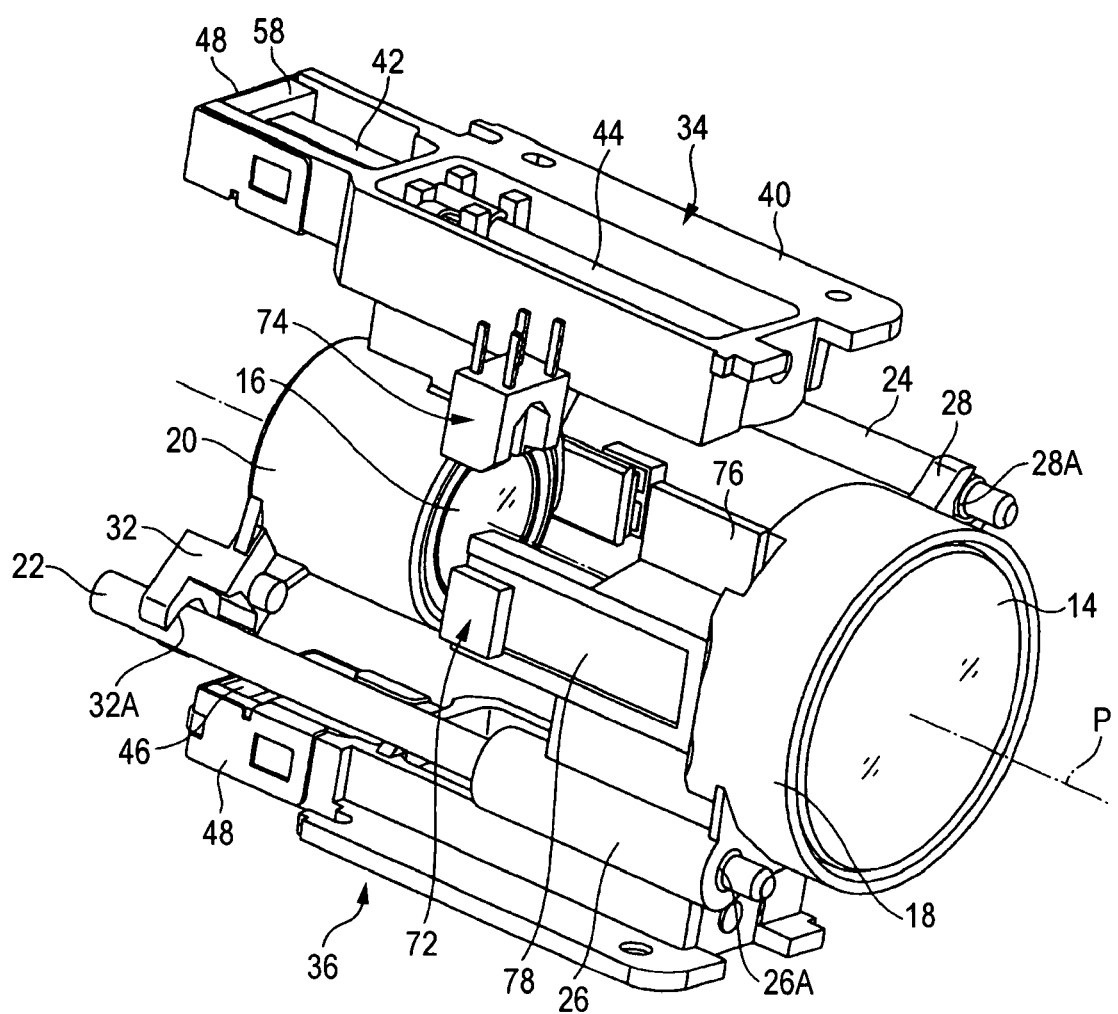
FIG. 3 is a perspective view of the lens device as viewed from a different direction as FIG. 2.

FIG. 1 is a perspective view of a lens device 10 to which an actuator according to the present invention is applied, and FIGS. 2 and 3 are perspective views of an internal arrangement of this device.

As shown in FIG. 1, the lens device 10 has a main body 12, formed to a substantially rectangular shape, and has zoom lenses (groups) 14 and 16 in the interior of the main body 12 as shown in FIGS. 2 and 3. Of the zoom lenses (groups) 14 and 16, one is a variator lens and the other is a compensator lens. The zoom lenses (groups) 14 and 16 are respectively held in holding frames 18 and 20, and these holding frames 18 and 20 are supported by two guide shafts 22 and 24 in a manner enabling sliding along an optical axis P direction. The two guide shafts 22 and 24 are disposed in parallel to the optical axis P at diagonal positions inside the main body 12 and are fixed to the main body 12.

The holding frame 18 has a guide portion 26, having an insertion hole 26A through which the guide shaft 22 is inserted, and an engaging portion 28, having a U-shaped groove 28A that is engaged with the guide shaft 24. The holding frame 18 is thereby guided by the two guide shafts 22 and 24, and the zoom lens (group) 14 is supported in a manner enabling movement along the optical axis P direction. Likewise, the holding frame 20 of the zoom lens 16 has a guide portion 30, having an insertion hole (not shown) through which the guide shaft 24 is inserted, and an engaging portion 32, having a U-shaped groove 32A, with which the guide shaft 22 is engaged. The holding frame 20 is thereby guided by the two guide shafts 22 and 24, and the zoom lens (group) 16 is supported in a manner enabling movement along the optical axis P direction.

The zoom lenses (groups) 14 and 16 are driven along the optical axis P direction by means of actuators 34 and 36, respectively. The actuators 34 and 36 are disposed at opposing faces of the main body 12. Specifically, the actuator 34 for the zoom lens (group) 14 is disposed on an upper face of the main body 12 in FIG. 1, and the actuator 36 for the zoom lens (group) 16 is disposed on a lower face of the main body 12. Though a description of the actuator 34 shall be provided below, the actuator 36 is arranged in the same manner.

Symbols 72 and 74 in FIGS. 1 to 3 indicate position detectors that detect positions of the holding frame 18 and the holding frame 20. The position detector 72 is a reflection type photointerrupter that is disposed opposite a plate-like reflecting portion 78, formed integral to the holding frame 18 (or the holding frame 20), and is fitted and fixed in an opening 12A of the main body 12 (see FIG. 1). On the reflecting portion 78, a plurality of reflecting bodies (not shown) are disposed at fixed intervals along the driving direction. Light is thus projected from the position detector 72 to the reflecting portion 78, and by receiving the reflected light and detecting the variation of the light amount, the movement amount of the reflecting portion 78 (that is, the holding frame 18 or 20) can be detected. Meanwhile, the position detector 74 has a light projecting portion 74A and a light receiving portion 74B, and a plate-like light blocking portion 76 that is formed integral to the holding frame 18 (or the holding frame 20) is inserted into and drawn out from in between the light projecting portion 74A and the light receiving portion 74B. Thus by the light blocking portion 76 being inserted between the light projecting portion 74A and the light receiving portion 74B and the light amount detected by the light receiving portion 74B varying accordingly, that the light blocking portion 76 (that is, the holding frame 18 or 20) has moved to a predetermined position can be detected. By thus detecting reference positions of the holding frames 18 and 20 by means of the position detector 74 and detecting the moving amounts of the holding frames 18 and 20 by means of the position detector 72, the positions of the holding frames 18 and 20 can be accurately determined. The actuators 34 and 36 are driven and controlled based on measurement values of the position detectors 72 and 74.

Figure 4:
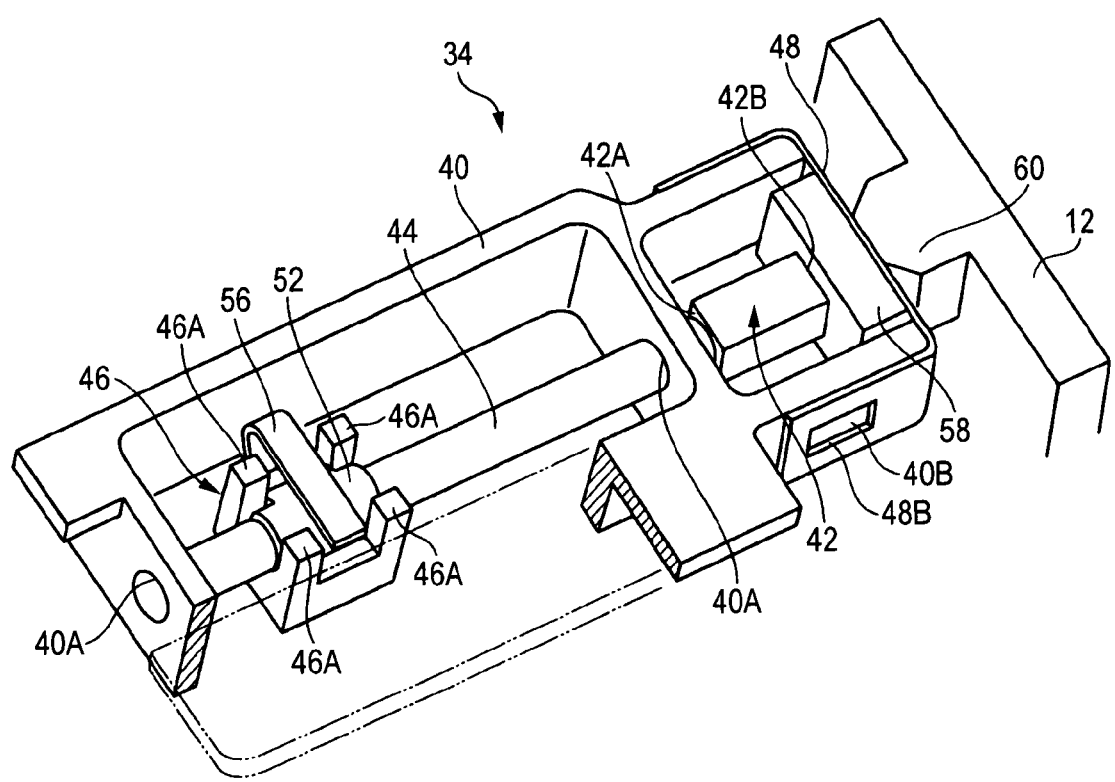
FIG. 4 is a schematic diagram of an arrangement of the actuator of the first embodiment.

FIG. 4 is a perspective view of an arrangement of the actuator 34. As shown in this FIGURE, the actuator 34 is mainly arranged from a fixed frame 40, a piezoelectric element (corresponding to being an electromechanical conversion element) 42, a driving shaft (corresponding to being a driving frictional member) 44, a connecting block (corresponding to being a driven member) 46, and a mounting bracket (corresponding to being an elastic supporting member) 48, and the fixed frame 40 is fixed to the main body 12 of the lens device 10 of FIG. 1.

The piezoelectric element 42 is layered along the optical axis P direction (hereinafter, "driving direction") of the lens device 10 and is arranged to deform (extend or contract) along the driving direction upon application of voltage. Thus with the piezoelectric element 42, end faces 42A and 42B in the longitudinal direction become displaced along the driving direction upon application of voltage.

Of the end faces 42A and 42B of the piezoelectric element 42, a base end of the driving shaft 44 is affixed to one end face 42A. The driving shaft 44 is formed to a cylindrical shape and is positioned so that its central axis lies along the driving direction. The driving shaft 44 is inserted through two holes 40A formed in the fixed frame 40 and is thereby guided and supported in a manner enabling sliding along the central axis direction. As the material of the driving shaft 44, a graphite crystal composite, such as carbon graphite, in which graphite crystals are firmly compounded, is used.

A connecting block 46 is engaged with the driving shaft 44. The connecting block 46 is connected to the above-described holding frame 18 of the zoom lens 14 and is supported in a manner enabling sliding along the optical axis P direction (the driving direction) along with the holding frame 18. The connecting block 46 is formed to a rectangular shape, and upwardly protruding protrusions 46A are respectively provided on the four corners thereof.

Figure 5:
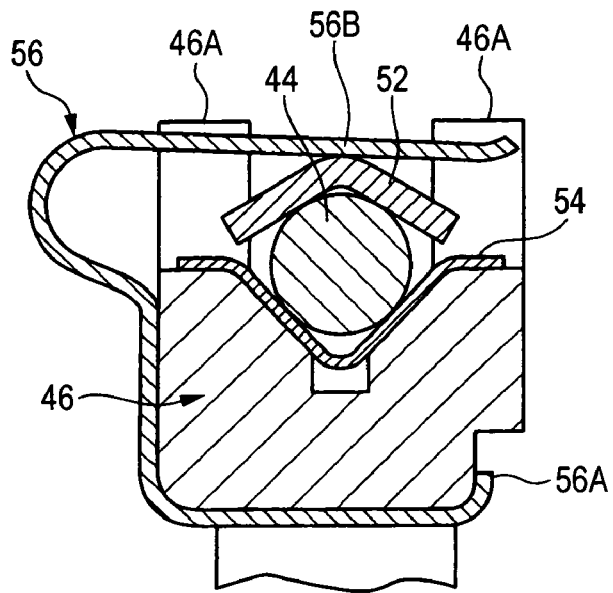
FIG. 5 is a sectional view of a connection portion of a driving shaft and a connecting block.

FIG. 5 is a sectional view of the connection portion of the connecting block 46 and the driving shaft 44. As shown in this FIGURE, a first sliding member 52 and a second sliding member 54 are provided at the connection portion of the connecting block 46 and the driving shaft 44. The first sliding member 52 is disposed at an upper side of the driving shaft 44, and the second sliding member 54 is disposed at a lower side of the driving shaft 44. The first sliding member 52 and the second sliding member 54 are members that are provided to obtain a stable frictional force between the connecting block 46 and the driving shaft 44, and are formed, for example, from stainless steel.

The second sliding member 54 is formed to a V-shape and is fixed to the connecting block 46. Meanwhile, the first sliding member 52 is formed to an inverted V-shape and is positioned in a region surrounded by the four protrusions 46A of the connecting block 46. The first sliding member 52 is notched at its respective corner portions in accordance with the protrusions 46A of the connecting block 46. Thus when the first sliding member 52 is positioned in the region surrounded by the protrusions 46A, the first sliding member 52 is prevented from falling off from the connecting block 46.

A pressing spring 56 is mounted onto the connecting block 46. The pressing spring 56 is arranged by bending a metal plate and is mounted onto the connecting block 46 by hitching a pawl 56A onto a lower portion of the connecting block 46. The pressing spring 56 also has a pressing portion 56B that is positioned on an upper side of the first sliding member 52 and is arranged to urge the first sliding member 52 downward by the pressing portion 56B. The driving shaft 44 is thereby put in a state of being sandwichingly pressed by the first sliding member 52 and the second sliding member 54, and the connecting block 46 is frictionally engaged with the driving shaft 44 via the first sliding member 52 and the second sliding member 54. The frictional force between the connecting block 46 and the driving shaft 44 is set so that when drive pulses of a gradual voltage variation is applied to the piezoelectric element 42, the frictional force is greater than the driving force, and when drive pulses of a rapid voltage variation is applied to the piezoelectric element 42, the frictional force is less than the driving force. Here, the frictional force (sliding resistance) is preferably no less than 10 gf and no more than 30 gf and more preferably no less than 15 gf and no more than 25 gf.

As shown in FIG. 4, a weight member 58, formed of a soft material, is fixed by adhesion onto the end face 42B of the piezoelectric element 42. By applying a load to the end face 42B, the weight member 58 prevents the end face 42B from becoming displaced more than the end face 42A. Thus as the weight member 58, a member that is greater in weight than the driving shaft 44 is preferable. Also, the weight member 58 is formed of a material with a Young's modulus less than that of each of the piezoelectric element 42 and the driving shaft 44 and, is formed of a material with a Young's modulus of no more than 300 MPa. For example, the weight member 58 is formed of urethane rubber or urethane resin, etc., and is manufactured by mixing a powder of tungsten or other metal into the rubber or resin to make the specific gravity high. To achieve compact size, the specific gravity of the weight member 58 is preferably made as high as possible and is set, for example, to approximately 8 to 12.

The weight member 58 is adhered onto the mounting bracket 48 at the side opposite the piezoelectric element 42. The mounting bracket 48 is formed by bending a thin metal plate to a square C-shape and openings 48B are formed at the bent portions at both ends. The mounting bracket 48 is mounted onto the fixed frame 40 by fitting protrusions 40B of the fixed frame 40 into the openings 48B. The piezoelectric element 42 is thus supported on the fixed frame 40 via the weight member 58 and the mounting bracket 48.

The piezoelectric element 42 that is supported as described above is supported in a manner in which the end face 42B can be displaced along the driving direction. That is, the end face 42B can be displaced along the driving direction by the expansion or contraction of the soft weight member 58 or the warping of the mounting bracket 48.

A pressing member 60 is disposed to the rear of the mounting bracket 48. The pressing member 60 is formed integral to the main body 12 of the lens barrel 10 and is disposed so as to be in planar contact with the mounting bracket 48 and press the mounting bracket 48 forward (that is, toward the piezoelectric element 42 side). The mounting bracket 48 is thus maintained in a state of being slightly elastically deformed forward (for example, by approximately 0.1 mm). The pressing member 60 is not restricted in particular in terms of shape and, for example, may be formed to a semispherical shape and put in point contact with the mounting bracket 48. The position of pressing by the pressing member 60 preferably lies along the extension of the central axis of the driving shaft 44.

Figure 6A:
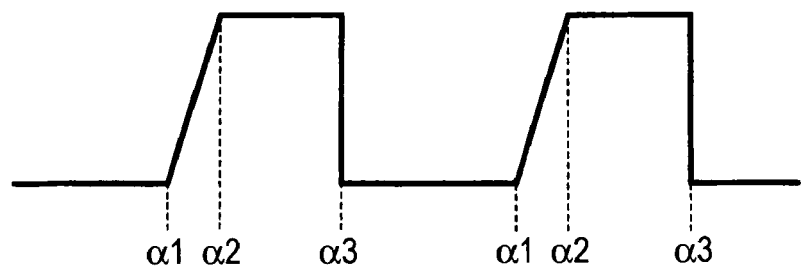
FIGS. 6A and 6B show diagrams of examples of voltage drive pulses that are applied to a piezoelectric element.
Figure 6B:
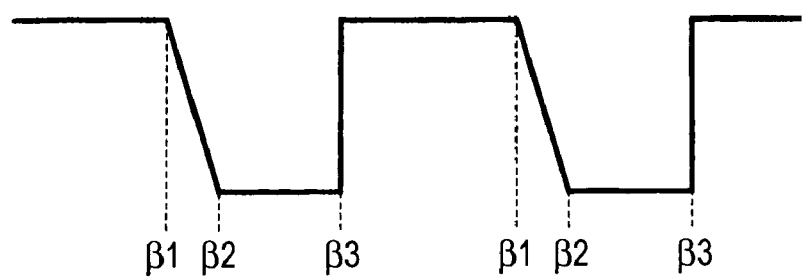

The voltages of the drive pulses shown in FIGS. 6A and 6B are applied to the piezoelectric element 42. FIG. 6A shows the drive pulses for moving the connecting block 46 of FIG. 4 in the left direction, and FIG. 6B shows the drive pulses for moving the connecting block 46 of FIG. 4 in the right direction.

In the case of FIG. 6A, substantially sawtooth-like drive pulses, each of which gradually rises from a time $\alpha 1$ to a time $\alpha 2$ and rapidly drops at a time $\alpha 3$, are applied to the piezoelectric element 42. Thus from the time $\alpha 1$ to the time $\alpha 2$, the piezoelectric element 42 gradually extends. Because in this process, the driving shaft 44 moves at a gradual speed, the connecting block 46 moves along with the driving shaft 44. The connecting block 46 of FIG. 4 can thereby be moved in the left direction. At the time $\alpha 3$, because the piezoelectric element 42 rapidly contracts, the driving shaft 44 moves in the right direction. Because in this process, the driving shaft 44 rapidly moves, the connecting block 46 remains stopped at the same position due to inertia and just the driving shaft 44 moves. Thus by repeatedly applying the sawtooth-like drive pulses shown in FIG. 6A, the connecting block 46 of FIG. 4 is made to repeat movement in the left direction and stoppage, and can thus be moved in the left direction.

In the case of FIG. 6B, substantially sawtooth-like drive pulses, each of which gradually drops from a time $\beta 1$ to a time $\beta 2$ and rapidly rises at a time $\beta 3$, are applied to the piezoelectric element 42. Thus from the time $\beta 1$ to the time $\beta 2$, the piezoelectric element 42 gradually contracts. Because in this process, the driving shaft 44 is displaced at a gradual speed, the connecting block 46 moves along with the driving shaft 44. The connecting block 46 of FIG. 4 can thereby be moved in the right direction. At the time $\beta 3$, because the piezoelectric element 42 rapidly extends, the driving shaft 44 moves in the left direction. Because in this process, the driving shaft 44 rapidly moves, the connecting block 46 remains stopped at the same position due to inertia and just the driving shaft 44 moves. Thus by repeatedly applying the sawtooth-like drive pulses shown in FIG. 6B, the connecting block 46 of FIG. 4 is made to repeat movement in the right direction and stoppage, and can thus be moved in the right direction.

The actions of the actuator 34 arranged as described above shall now be described.

Figure 8:
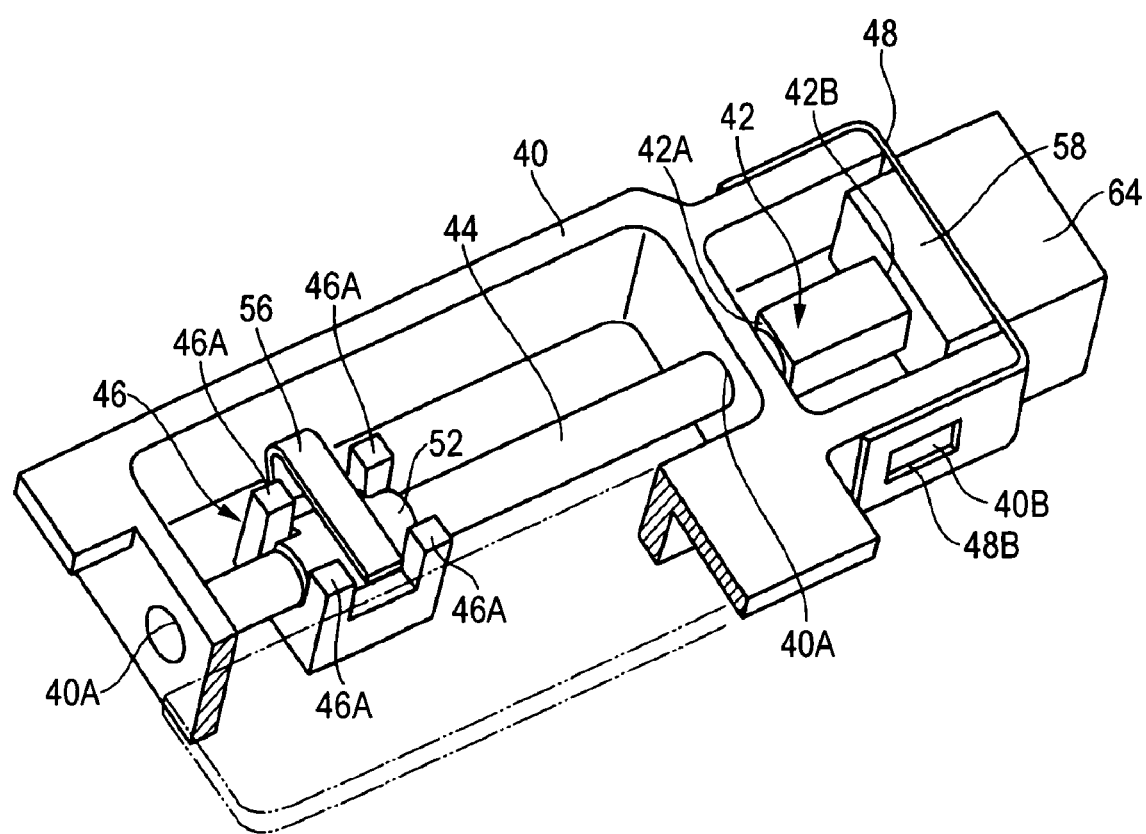
FIG. 8 is a diagram of an arrangement of an actuator of a comparative example.

Because the zoom lenses (groups) 14 and 16 are large in movement amount in comparison to a focusing lens, etc., the driving shaft 44 becomes long and the vibration of the piezoelectric element 42 is not readily transmitted to the tip of driving shaft 44. In the related art, to resolve this problem, a large weight member 64 of large weight had to be mounted as shown in FIG. 8. The related-art lens device thus required a larger weight member the longer the moving distance of the connecting block 46, and the device thus became large.

On the other hand, with the embodiment shown in FIG. 4, the pressing member 60 is disposed to the rear of the mounting bracket 48 and by this pressing member 60 pressing the mounting bracket 48, the mounting bracket 48 is maintained in an elastically deformed state. By this arrangement, the same effect as the arrangement shown in FIG. 8 (that is, the attachment of a large weight member 64 to the end face 42B of the piezoelectric element 42) is obtained by the elastic force of the mounting bracket 48. That is, the moving distance, moving speed, and thrust of the connecting block 46 are thus improved, and even when the moving amount of the connecting block 46 is large, stable drive control can be performed.

Also, with the present embodiment, because the mounting bracket 48 is simply pressed by the pressing member 60, the device can be made compact in comparison to the case where the large weight member 64 is provided. Especially with this embodiment, because the pressing member 60 is formed integral to the main body 12, the number of parts can be reduced and the device can be made compact.

Figure 7:
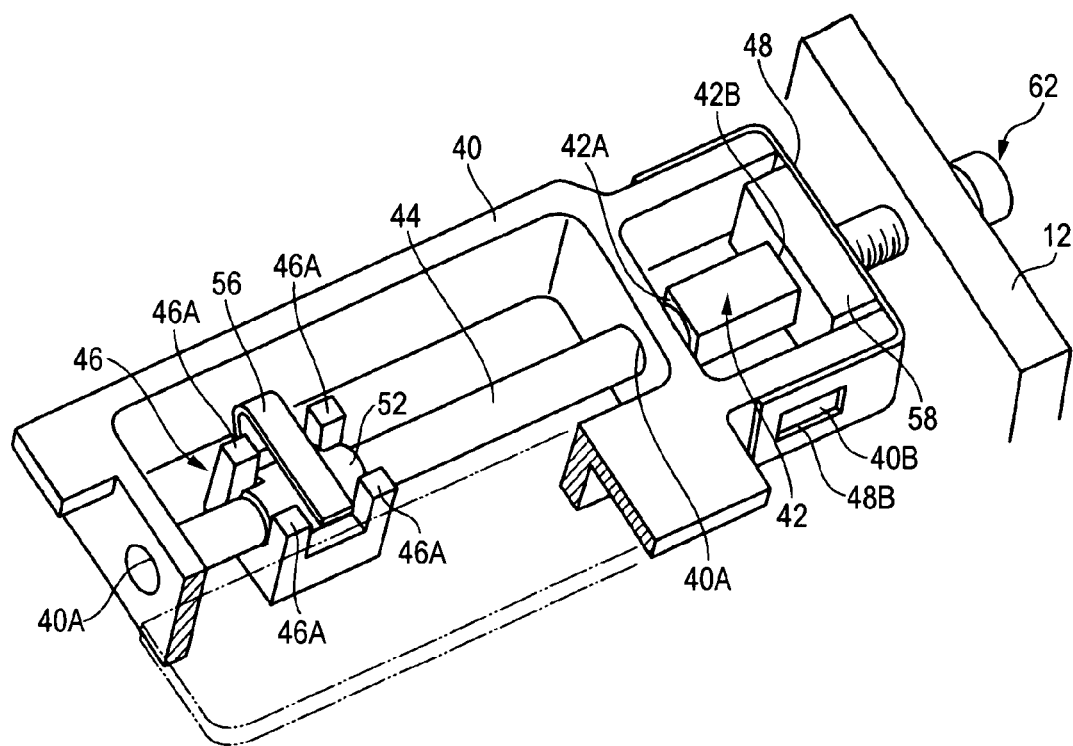
FIG. 7 is a schematic diagram of an arrangement of an actuator of a second embodiment.

A second embodiment of an actuator according to the present invention shall now be described. The actuator of the second embodiment shown in FIG. 7 has an adjusting screw 62 disposed to the rear of the mounting bracket 48. The adjusting screw 62 is screwed into the main body 12 of the lens device 10, and a tip thereof is made to press the mounting bracket 48. Also, the adjusting screw 62 is positioned along the extension of the central axis of the driving shaft 44 and is made to press the mounting bracket 48 in the driving direction.

With the second embodiment arranged as described above, because the mounting plate 48 is pressed and maintained in an elastically deformed state by the adjusting screw 62, the moving distance, moving speed, and thrust of the connecting block 46 can be improved.

Also, with the second embodiment, by adjusting the amount of tightening of the adjusting screw 62, the pressing force can be readily adjusted. The moving distance, moving speed, and thrust of the connecting block 46 can thus be adjusted to appropriate values.

Though in the above-described embodiments, the piezoelectric element 42 is supported via the mounting bracket 48 with a spring property, any member that provides an elastic force may be used, and for example, the rear end face of the piezoelectric element 42 may be supported via a rubber material, etc. Even in this case, by pressing the rubber material, etc., in the driving direction and maintaining an elastically deformed state, the same effects as those described above are obtained.

Also, as applications of the actuator according to the present invention, application, for example, to digital cameras, mobile phones, and other compact precision apparatuses is possible. Especially with a mobile phone, driving must be performed at a low voltage of no more than 3V, and by using the actuator according to the present invention, driving at a high frequency of approximately 20 kHz is enabled and the holding frame 20 can be moved at a high speed of no less than 2 mm/s. Thus even a zoom lens requiring movement of approximately 10 mm can be rapidly moved. Applications of the actuator according to the present invention are not restricted to applications of moving focusing lenses, zoom lenses, and other movable lenses, and use in applications in which a CCD is moved is also possible.

Though the material of the weight member 58 in the present invention is not restricted to the above-described soft material and a hard material may be used, the use of a soft material is preferable from the following points. That is, by using the weight member 58 formed of a soft material, the resonance frequency of the system arranged from the piezoelectric element 42, the driving frictional member 44, and the weight member 58 is made low. By the resonance frequency being made low, effects due to scattering among arrangements of the piezoelectric element 42, the driving driving shaft 44, and the weight member 58 are lessened, and a stable driving force can be obtained. Also, by the resonance frequency $f_0$ being made low, the driving frequency $f$ can be readily set in a vibration-proof region of $f \geq 2^{1/2} \cdot f_0$ to lessen the effects of resonant vibration and enable as table driving force to be obtained. Because the driving force due to extension and contraction of the piezoelectric element 42 is thereby reliably transmitted to the driven member, the driven member can be accurately moved in the extension/contraction direction of the piezoelectric element 42. Also, because the effects due to resonant vibration are lessened by the resonance frequency $f_0$ being made low, the supporting position and supporting method of the actuator can be arbitrarily selected, and for example, the actuator can be supported at the end face 42A or a side face of the piezoelectric element 42 and a side face or an end face of driving shaft 44.

With the actuator according to the present invention, because the other side of the electromechanical conversion element is supported via the elastic supporting member and the elastic supporting member is maintained in the elastically deformed state, the moving distance, moving speed, and thrust of the driven member can be improved without using a large weight member. Stable drive control can thus be performed and the device can be made compact.

The entire disclosure of each and every foreign patent application from which the benefit of foreign priority has been claimed in the present application is incorporated herein by reference, as if fully set forth.

What is claimed is:

1. An actuator comprising:
an electro-mechanical conversion element;
a driving frictional member that is mounted onto a front end face in an extension/contraction direction of the electromechanical conversion element;
a driven member that is frictionally engaged with the driving frictional member;
a fixed frame;
an elastic supporting member that is mounted onto a rear end face in the extension/contraction direction of the electromechanical conversion element and displaceably supports the rear end face of the electromechanical conversion element with respect to the fixed frame; and
a pressing member that presses the elastic supporting member in the extension/contraction direction to maintain the elastic supporting member in an elastically deformed state.

2. The actuator according to claim 1,
wherein the pressing member is integrally formed with the fixed frame.

3. The actuator according to claim 1,
wherein the pressing member is an adjusting screw that is screwed onto the fixed frame, and
the elastic supporting member is pressed by a tip of the adjusting screw.

4. The actuator according to claim 1,
wherein the elastic supporting member is a plate member having a spring property and has both of its ends supported by the fixed frame, and
the rear end face of the electromechanical conversion element is affixed to a central portion of the elastic supporting member.

5. The actuator according to claim 1,
wherein a holding frame of a zoom lens is mounted onto the driven member.

6. The actuator according to claim 5,
wherein the pressing member is integrally formed with the holding frame.

7. The actuator according to claim 5,
wherein the pressing member is an adjusting screw that is screwed onto the holding frame.

8. The actuator according to claim 1, further comprising:
a weight member fixed at a first side of the weight member to the rear end face of the electromechanical conversion element.

9. The actuator according to claim 8,
wherein the weight member is greater in weight than the driving frictional member.

10. The actuator according to claim 8,
wherein a second side of the weight member is fixed to the elastic supporting member so that the electro-mechanical conversion element is supported on the fixed frame by and the weight member and the elastic supporting member.

* * * * *